(12) United States Patent
Denis

(10) Patent No.: US 7,837,169 B2
(45) Date of Patent: Nov. 23, 2010

(54) VIBRATION DAMPING MOUNTING FOR A BRUSH CUTTER

(76) Inventor: Laurent Denis, 123 du Marche, Roxton Falls, Québec (CA) J0H 1E0

( * ) Notice: Subject to any disclaimer, the term of this patent is extended or adjusted under 35 U.S.C. 154(b) by 0 days.

(21) Appl. No.: 12/008,203

(22) Filed: Jan. 8, 2008

(65) Prior Publication Data

US 2008/0168757 A1 Jul. 17, 2008

(51) Int. Cl.
*A47F 5/00* (2006.01)
(52) U.S. Cl. ..................... 248/316.8; 403/11
(58) Field of Classification Search ............... 414/723, 414/724; 172/439, 776, 630, 272; 403/11; 248/200, 300, 316.8, 223.31; 56/12.6
See application file for complete search history.

(56) References Cited

U.S. PATENT DOCUMENTS

| | | | | |
|---|---|---|---|---|
| 3,672,521 A * | 6/1972 | Bauer et al. | ............... | 414/723 |
| 4,352,510 A * | 10/1982 | Saito et al. | ............... | 280/727 |
| 4,812,103 A * | 3/1989 | Cochran et al. | ............... | 414/723 |
| 4,923,017 A * | 5/1990 | Meek et al. | ............... | 172/776 |
| 5,078,569 A * | 1/1992 | Cook | ............... | 414/723 |
| 5,364,145 A * | 11/1994 | Epstein | ............... | 294/82.27 |
| 5,513,485 A | 5/1996 | Hashimoto et al. | | |
| 5,642,765 A | 7/1997 | Brown | | |
| 5,692,855 A * | 12/1997 | Burton | ............... | 403/325 |
| 5,820,332 A * | 10/1998 | Philips et al. | ............... | 414/723 |
| 5,944,298 A * | 8/1999 | Koike | ............... | 248/674 |
| 5,950,735 A * | 9/1999 | Godbersen | ............... | 172/439 |
| 5,975,167 A | 11/1999 | Brown | | |
| 6,082,467 A * | 7/2000 | Friesen | ............... | 172/630 |
| 6,163,989 A * | 12/2000 | Kaczmarski et al. | ............... | 37/468 |
| 6,347,671 B1 * | 2/2002 | Stiller et al. | ............... | 172/439 |
| 6,386,558 B1 * | 5/2002 | Chang | ............... | 280/40 |
| 6,450,473 B1 * | 9/2002 | Kondo et al. | ............... | 248/560 |
| 7,137,656 B2 * | 11/2006 | Bird et al. | ............... | 292/341.12 |
| 7,325,777 B2 * | 2/2008 | Thiessen | ............... | 248/278.1 |
| 7,354,031 B2 * | 4/2008 | Okanaka et al. | ............... | 267/140.12 |
| 7,478,490 B2 * | 1/2009 | Segerljung | ............... | 37/468 |
| 7,478,519 B2 * | 1/2009 | Phillips | ............... | 56/15.9 |

* cited by examiner

*Primary Examiner*—Árpád Fábián-Kovács

(57) ABSTRACT

A mounting for connecting an operating head, that generates vibrations when in use, to a vehicle in a manner to minimize the transmission of vibrations from the head to the vehicle. The mounting comprising a number of female connector device on one of the head and the vehicle and a similar number of male connecting device on the other of the head and vehicle, the male connecting device each carrying a resilient sleeve. The male connecting device are inserted into the female connecting device and a bolt is passed through each female connecting device and each resilient sleeve associated with it to join the head to the vehicle.

14 Claims, 2 Drawing Sheets

VIBRATION DAMPING MOUNTING FOR A BRUSH CUTTER

BACKGROUND OF THE INVENTION

1. Technical Field

This invention is directed toward an vibration damping mounting for connecting an operating head, which generates vibrations during operation, to a vehicle. The invention is particularly directed toward an vibration damping mounting for connecting a rotating brush cutting head to a brush cutting vehicle carrying the head.

2. Background Art

Heavy equipment, employing an operating head which creates vibrations during use, has the head normally fixed to a vehicle carrying the head. As a result, the vibrations generated in the head during its operation are transmitted to the vehicle and could adversely affect the operator of the vehicle.

An example of such heavy equipment is a brush cutter having a brush cutting head fixedly mounted on the front of a vehicle. The head carries a rotating drum with teeth, the teeth cutting brush as the drum is rotated and as the vehicle is moved ahead. Vibrations are created by the teeth striking the brush to cut it and these vibrations are transmitted to the operator of the vehicle. Examples of the type of brush cutting vehicle to which the invention is particularly adapted are shown in U.S. Pat. Nos. 5,513,485, 5,642,765 and 5,975,167 by way of example.

SUMMARY OF THE INVENTION

It is the purpose of the present invention to provide a resilient mounting for attaching the operating head to the vehicle to minimize the transmission of vibrations from the head to the vehicle. It is more particularly the purpose of the present invention to provide a resilient mounting for attaching a brush cutting head to the front of a vehicle on a brush cutter.

In accordance with the present invention the resilient mounting has a number of male connecting means mounted on one of the brush cutting head and the front of the brush cutting vehicle and a corresponding number of female connecting means mounted on the other of the brush cutting head and the brush cutting vehicle. The male connecting means are in the form of brackets as are the female connecting means, the male and female brackets sized, and located on both the head and vehicle respectively, to have the male brackets snugly enter the female brackets when connecting the head to the vehicle. The male brackets carry a rigid tubular sleeve at their end, the longitudinal axis of which is parallel to the longitudinal axis of the rotating drum in the brush cutting head when the head is attached to the vehicle. A resilient tubular sleeve is mounted within the rigid tubular sleeve on the male brackets. A bolt is passed through each female bracket and the resilient sleeve on its corresponding male bracket, when the male bracket is properly mounted in the female bracket, to detachable connect the brush cutting head to the vehicle. The resilient sleeves minimize the vibrations transmitted between the brush cutting head and the brush cutting vehicle during operation of the head.

The invention is particularly directed toward a resilient mounting for connecting an operating head, that generates vibrations when in use, to a vehicle in a manner to minimize the transmission of the vibrations from the head to the vehicle. The mounting comprising a number of female connecting means on one of the head end the vehicle and a corresponding number of male connecting means on the other of the head and vehicle. The male connecting means each carry a resilient sleeve. Each male connecting means is inserted into the female connecting means and a bolt is passed through each female connecting means and each resilient sleeve associated with it to join the head to the vehicle.

The invention is more particularly directed toward a resilient mounting for connecting a brush cutting head, having a rotatable cylindrical drum carrying cutting teeth, to a brush cutting vehicle in a manner to minimize the transmission of the vibrations from the head to the vehicle when the vehicle is being operated to cut brush. The resilient mounting comprises a number of female connecting means on one of the head and the vehicle and a corresponding number of male connecting means on the other of the head and vehicle, the female and male connecting means sized and located to have the male connecting means snuggly enter the female connecting means when connecting the brush cutting head to the brush cutting vehicle. The male connecting means each carry a tubular resilient sleeve, the longitudinal axis of the resilient sleeve parallel to the longitudinal rotational axis of the cylindrical drum when the male connecting means is inserted into the female connecting means. A bolt passes through each female connecting means and each resilient sleeve associated with it to detachably join the head to the vehicle.

DESCRIPTION OF SEVERAL VIEWS OF THE DRAWINGS

FIG. 1 is a perspective view of a brush cutter head adjacent a brush cutting vehicle it is to be attached to;

DETAILED DESCRIPTION OF THE INVENTION

Figure 1:
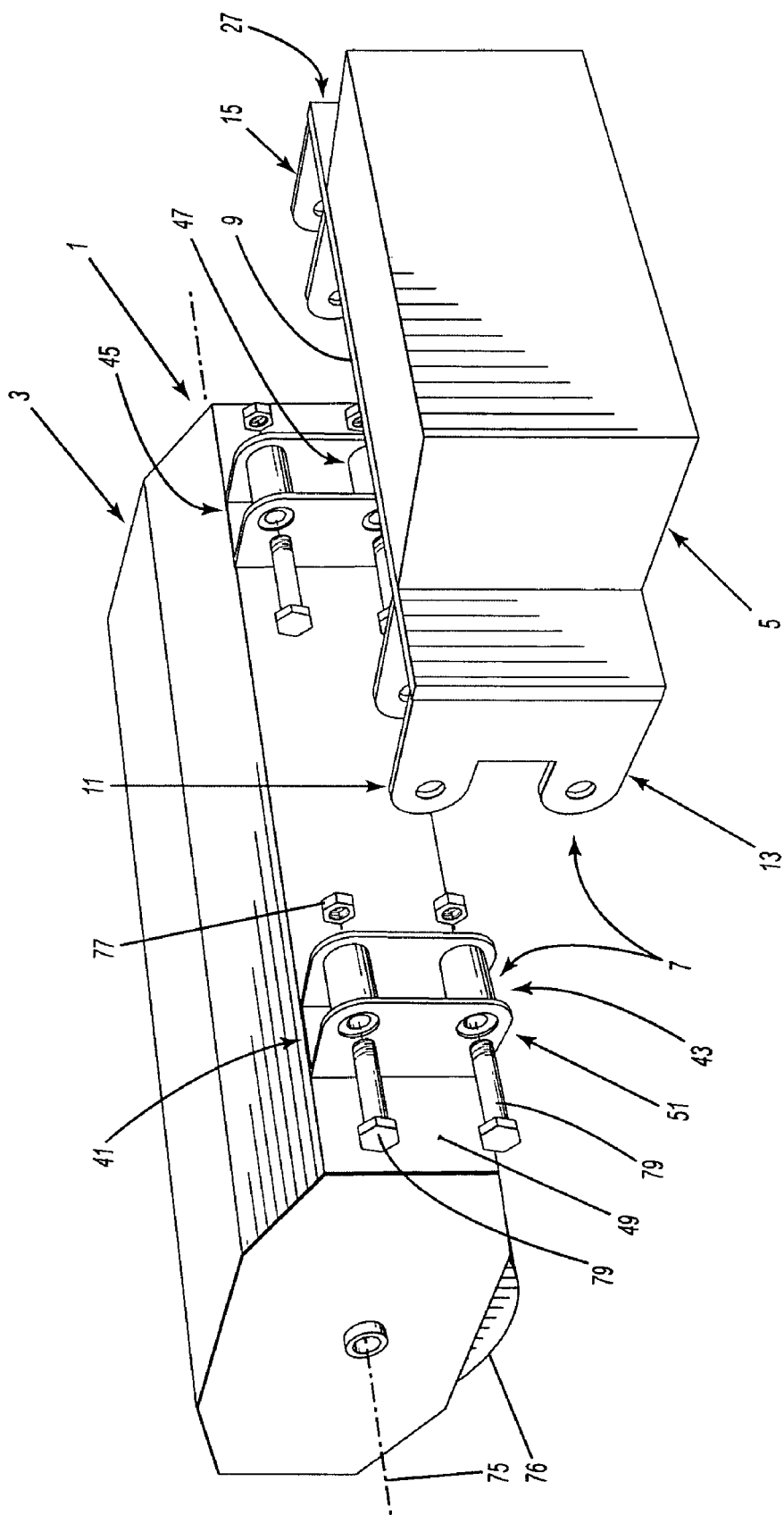
Figure 2:
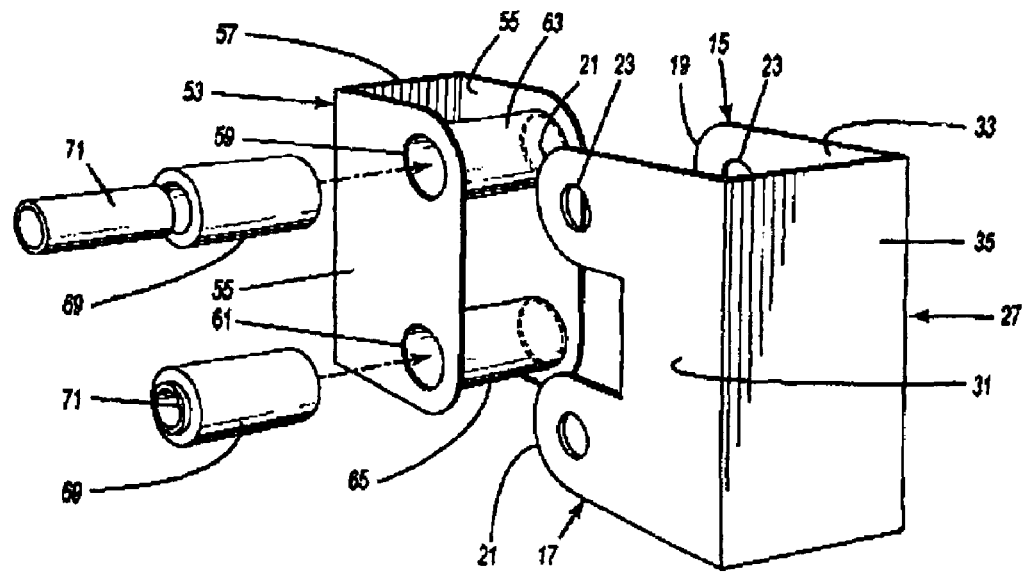
FIG. 2 is a detail perspective view of part of the mounting means used to mount the brush cutter head to the vehicle.
Figure 3:
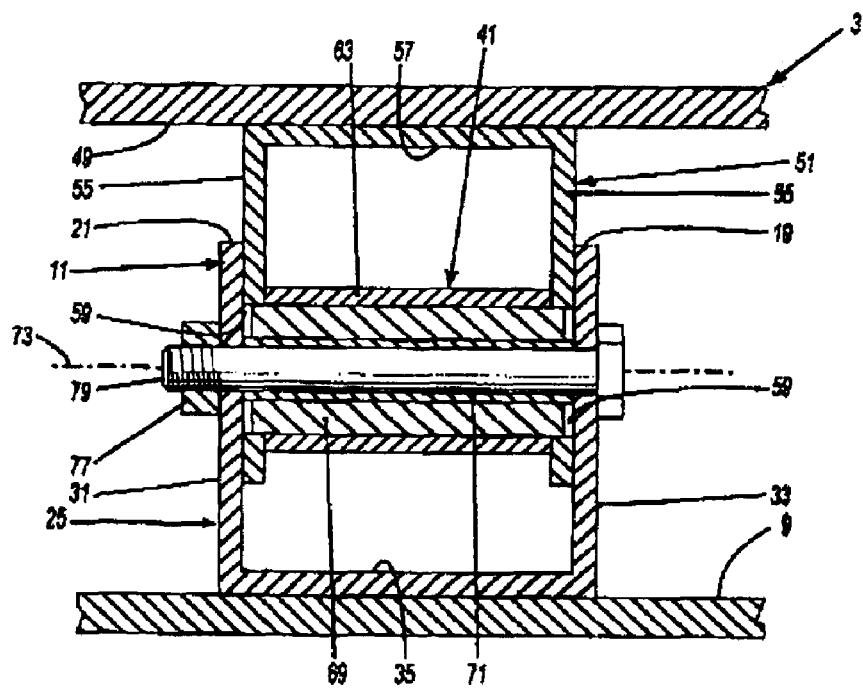
FIG. 3 is a cross-section view of an assembled mounting means.

As shown in the figures, the brush cutter 1 has a brush cutting head 3 mounted on the front of a brush cutting vehicle 5 by means of mounting means 7. The mounting means 7 has a rectangular mounting plate 9 fixedly mounted on the front of the vehicle 5 by bolting or other suitable means. The mounting plate 9 faces forwardly in a vertical position with the long sides of the plate horizontal. The plate 9 carries four female connecting means 11, 13, 15, 17 at the corners of the plate. Each connecting means comprises a pair of horizontally spaced-apart ears 19, 21 extending forwardly from the plate. The ears 19, 21 each have a bolt hole 23 there through, the holes 23 horizontally aligned. The upper connecting means 11, 15 are horizontally aligned and located over the lower connecting means 13, 17 respectively which are also horizontally aligned.

The left hand connecting means 11, 13 are part of a first female bracket 25 and the right hand connecting means 15, 17 are part of a second female bracket 27. The female brackets 25, 27 are the same so only the bracket 27 will be described in detail. Bracket 27 comprises a channel shaped member having side walls 31, 33 joined by a back wall 35. The ears 19, 21 of the connecting means 11, 13 are formed in the top and bottom of the side walls 31, 33 respectively and extend forwardly from the back wall 35. The brackets 25, 27 are mounted on the front of the plate 9, one on one side and the other on the other side of the plate, with their back wall 35 flush against the plate and connected thereto by welding, bolts or other suitable means. The connecting means 11, 13, 15, 17 form the corners of an imaginary rectangular and are located at the corners of the rectangular plate 9.

The mounting means 7 includes four male connecting means 41, 43, 45, 47 carried on the back wall 49 of the brush cutting head 3. The upper connecting means 41, 45 are spaced apart and horizontally aligned and overlie the lower connecting means 43, 47 respectively, the lower connecting means 43, 47 also horizontally aligned. The connecting means 41, 43 on one side of the head 3 share a first male bracket 51 and the connecting means 45, 47 on the other side of the head 3 share a second male bracket 53. The brackets 51, 53 are attached to the back wall 49 of the head 3 by welding, bolting or other suitable means.

The male brackets 51, 53 are identical so only one will be described in detail. Bracket 53 is a channel shaped member having side walls 55 joined by a back wall 57. There are upper and lower mounting holes 59, 61 in each side wall 55. Upper and lower rigid tubular members 63, 65 extend between the sidewalls 55, the tubular members 63, 65 aligned with the upper and lower mounting holes 59, 61 in each side wall respectively. The tubular members 63, 65 are fixed to the side walls 55 and have an inner diameter equal to the diameter of the holes 59, 61.

Each male connecting means 41, 43, 45, 47 has a resilient tubular sleeve 69 mounted on a rigid tubular support 71. The rigid tubular support 71 is slightly longer than the sleeve 69. The sleeve 69 is sized to snugly fit within the tubular members 63, 65 and can even extend slightly past their ends into the holes 59, 61 in the side walls 55. The tubular support 71 extends to the outside of the side walls 55. It will be seen that the longitudinal axis 73 common to the concentric tubular support 71, the resilient sleeve 69 and the tubular members 63 or 65 in the male connecting members 41, 43, 45, 47 are parallel to each other, and to the rotational axis 75 of the cylindrical cutting drum 76 in the cutting head 3.

It will be seen that the connecting means 41 includes the upper part of bracket 51, upper mounting holes 59, upper tubular member 63, resilient tubular sleeve 69 and rigid support 71 while the connecting means 43 includes the bottom part of bracket 51, lower mounting holes 61, lower tubular member 65, another resilient tubular sleeve 69 and another rigid support 71. The connecting means 45 includes the upper part of bracket 53, upper mounting holes 59, upper tubular member 63, resilient tubular sleeve 69 and rigid support 71 while the connecting means 47 includes the lower part of bracket 53, lower mounting holes 61, lower tubular member 65, another resilient tubular sleeve 69 and another rigid support 71.

The male connecting means 41, 43, 45 and 47 form the corners of an imaginary rectangle on the back wall 49 of the cutter head 3 matching the imaginary rectangle formed by the female connecting means 11, 13, 15 and 17 on the plate 9 on the vehicle 5.

In use, the brush cutter head 3 is mounted against the mounting plate 9 on the front of the vehicle 5, with the male brackets 51, 53 on the brush cutter head 3 snugly entering into the female brackets 25, 27 on the plate 9. The male connecting means 41, 43, 45, 47 enter between the female connecting means 11, 13, 15, 17. More specifically, each male connecting means 41, 43, 45, 47 is located between a pair of ears 19, 21 with the rigid tubular support 71 of each male connecting means aligned with the holes 23 in each pair of ears 19, 21. A bolt 79, forming part of the mounting means 7, is passed through the holes 23 in the female connecting means and the rigid support 71 of male connecting means and a nut 77 on the bolt 79 securely connects the male and female connecting means together. The resilient sleeves 69 dampen any vibrations passing from the cutting head 3 to vehicle 5 while the cutting head is being operated.

The invention has been described with the four female connecting means sharing two female brackets and the four male connecting means sharing two male brackets. It will be obvious that each of the four female connecting means and each of the four male connecting means can have its own bracket. The female connecting means have been described as being on the vehicle and the male connecting means as being on the cutting head but they can be reversed so that the female connecting means are on the cutting head while the male connecting means are on the vehicle.

The invention has been described as having four connections between the vehicle and the cutting head, the connections at the corners of an imaginary rectangle. The arrangement provides a detachable resilient mounting which securely holds the cutting head against linear movement in any direction and against any twisting or rotational movement. However the invention could be used with two, three, five or six connections between vehicle and the cutting head if so desired.

I claim:

1. A mounting for connecting a brush cutting head, having a cylindrical cutting drum rotatable about its longitudinal axis, to a vehicle in a manner to minimize the transmission of the vibrations from the head to the vehicle when the cutting head is operated, the mounting comprising a number of female connecting means on one of the head and the vehicle and a corresponding number of male connecting means on the other of the head and vehicle, the female and male connecting means sized and located to have the male connecting means snuggly enter the female connecting means when connecting the brush cutting head to the brush cutting vehicle, the male connecting means each carrying a tubular resilient sleeve, the longitudinal axis of the resilient sleeve parallel to the longitudinal rotational axis of the cylindrical drum when the male connecting means is inserted into the female connecting means and a bolt passing through each female connecting means, and each resilient sleeve associated with each female connecting means, to detachably, yet immovably, join the head to the vehicle.

2. A mounting as claimed in claim 1, wherein there are four female and four male connecting means, the four female connecting means on the corners of an imaginary female rectangle, the four male connecting means on the corners of an imaginary male rectangle matching the shape of the imaginary female rectangle.

3. A mounting as claimed in claim 2 wherein two of the female connecting means share a first female bracket, one connecting means above the other, and the other two female connecting means share a second female bracket, one connecting means above the other, the two brackets mounted on the one of the cutting head and the vehicle horizontally spaced apart and parallel to each other.

4. A mounting as claimed in claim 3 wherein two of the male connecting means share a first male bracket, one connecting means above the other, and the other two male connecting means share a second male bracket, one connecting means above the other, the two brackets mounted on the other of the cutting head and the vehicle horizontally spaced apart and parallel to each other, the male brackets snugly insertable into the female brackets.

5. A mounting as claimed in claim 1 wherein each male connecting means carries a rigid tubular member within which the resilient tubular sleeve is mounted, and a rigid tubular support mounted within the tubular sleeve, the bolt passing through the tubular support.

6. A mounting as claimed in claim 3 wherein each male connecting means carries a rigid tubular member within which the resilient tubular sleeve is mounted, and a rigid tubular support mounted within the tubular sleeve, the bolt passing through the tubular support.

7. A mounting as claimed in claim 3 wherein each male connecting means carries a rigid tubular member within which the resilient tubular sleeve is mounted, and a rigid tubular support mounted within the tubular sleeve, the bolt passing through the tubular support.

8. A mounting as claimed in claim 4 wherein each male connecting means carries a rigid tubular member within which the resilient tubular sleeve is mounted, and a rigid tubular support mounted within the tubular sleeve, the bolt passing through the tubular support, the rigid tubular member mounted within the bracket.

9. A mounting as claimed in claim 3 wherein each female connecting means on each bracket includes a pair of spaced apart ears extending forwardly from the bracket, a hole in each ear horizontally aligned with the hole in the other ear, the bolt passing through the holes.

10. A mounting as claimed in claim 9 wherein two of the male connecting means share a first male bracket, one connecting means above the other, and the other two male connecting means share a second male bracket, one connecting means above the other, the two brackets mounted on the other of the cutting head and the vehicle horizontally spaced apart and parallel to each other, the male brackets snugly insertable into the female brackets between the spaced pairs of ears.

11. A mounting as claimed in claim 10 wherein each male connecting means carries a rigid tubular member fixedly mounted with the male bracket, the resilient tubular sleeve mounted within the rigid tubular member, and a rigid tubular support mounted within the tubular sleeve, the bolt passing through the tubular support and the aligned holes in the ears in the female connecting means.

12. A mounting as claimed in claim 9 wherein each male connecting means carries a rigid tubular member within which the resilient tubular sleeve is mounted, and a rigid tubular support mounted within the tubular sleeve, the bolt passing through the tubular support.

13. A mounting as claimed in claim 1 wherein each female connecting means has a female bracket, each bracket including a pair of spaced apart ears extending forwardly from the female bracket, a hole in each ear horizontally aligned with the hole in the other ear, the bolt passing through the holes.

14. A mounting as claimed in claim 13 wherein each male connecting means has a male bracket, a rigid tubular member fixedly mounted within the bracket and aligned with holes in the male bracket, the resilient tubular member mounted within the rigid tubular member, a rigid tubular support within the tubular sleeve, the bolt passing through the holes in the male bracket and through the rigid tubular support.

* * * * *